United States Patent [19]

Airhart et al.

[11] Patent Number: 4,721,181

[45] Date of Patent: Jan. 26, 1988

[54] BASE PLATE LOCATOR FOR SEISMIC SOURCE

[75] Inventors: Tom P. Airhart; Andrew B. Woodrow, both of Plano, Tex.

[73] Assignee: Atlantic Richfield Co., Los Angeles, Calif.

[21] Appl. No.: 846,393

[22] Filed: Mar. 31, 1986

[51] Int. Cl.[4] .............................................. G01V 1/04
[52] U.S. Cl. .................................. 181/114; 181/121; 181/401; 248/678
[58] Field of Search ............... 181/113, 114, 116, 117, 181/119, 121, 401; 367/189, 190; 248/573, 678, 638, 634, 678; 52/167

[56] References Cited

U.S. PATENT DOCUMENTS

| | | | |
|---|---|---|---|
| 1,572,574 | 2/1926 | Stromborg | 52/167 X |
| 3,024,861 | 3/1962 | Clynch | 181/114 |
| 3,291,249 | 12/1966 | Bays | 181/114 |
| 3,306,391 | 2/1967 | Bays | 181/114 |
| 3,393,763 | 7/1968 | Sundt | 181/114 |
| 3,899,281 | 8/1975 | Jakobs | 248/638 X |
| 4,284,165 | 8/1981 | Airhart et al. | 181/119 |
| 4,402,381 | 9/1983 | Airhart | 181/121 X |

Primary Examiner—Deborah L. Kyle
Assistant Examiner—Brian S. Steinberger
Attorney, Agent, or Firm—Robert M. Betz

[57] ABSTRACT

The weight of a transport vehicle and the actuator of an impact type seismic source carried thereby is partially transferred by means of hydraulic lift cylinders to a freely movable earth contacting baseplate positioned beneath the actuator. In operation a mass is propelled by the actuator along a prescribed slant path to strike the baseplate. Shear strain is induced in elastomeric pads sandwiched between the hydraulic lift cylinders and the baseplate if the baseplate shifts sideways under such a slanting blow. The pads then exert a force to restore the vehicle and the actuator to a correct perpendicular alignment over the baseplate. Upper and lower position locator means fixed respectively to the hydraulic lift cylinders and to the baseplate interface with the elastomeric pads and fit slidably within each other so as to transmit vertical force from vehicle to baseplate. Intentional slight misalignment between the upper and lower locator means induces further restorative strain in the elastomeric pads as the locator means engage with each other.

3 Claims, 9 Drawing Figures

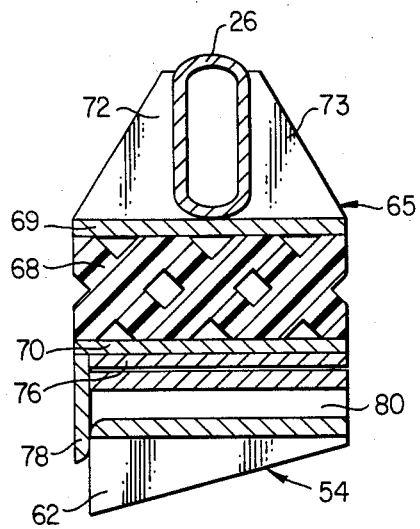
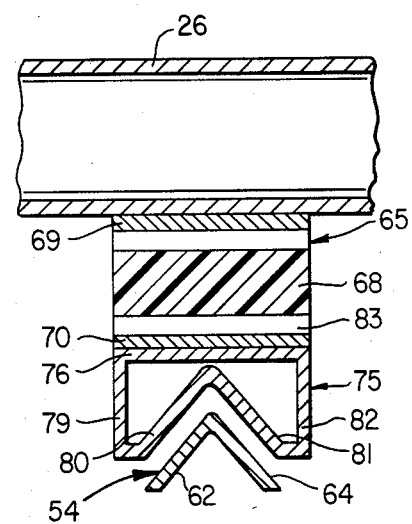
FIG. 6
FIG. 7
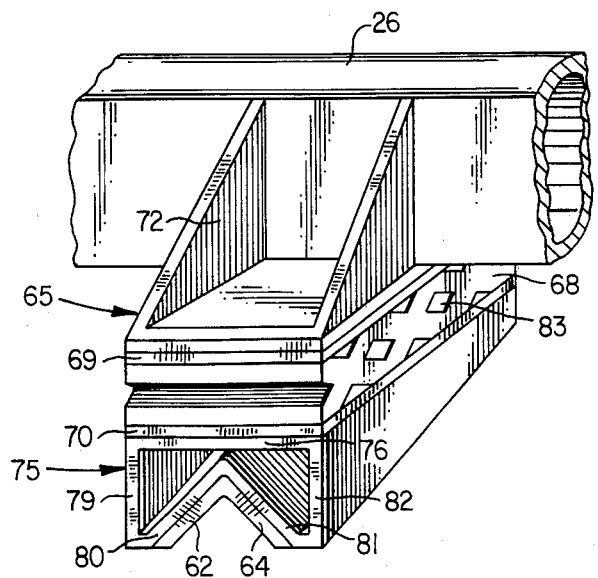
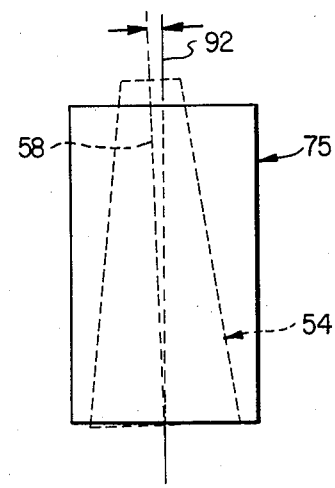
FIG. 8
FIG. 9

BASE PLATE LOCATOR FOR SEISMIC SOURCE

BACKGROUND OF THE INVENTION

1. Field of the Invention

This invention relates generally to the field of seismic prospecting and more particularly to impact type surface seismic sources where in a heavy mass is propelled downwardly to impact an earth-contacting base plate, thereby generating a seismic pulse of acoustic frequency.

2. Description of the Prior Art

As described in U.S. Pat. No. 4,284,165 issued Aug. 18, 1981 to Tom P. Airhart et al, entitled Acoustic Pulse Generator, apparatus for generating an acoustic pulse employs a hollow upstanding housing having a circular, longitudinal bore open at its lower end and closed at its upper end. An elongated piston extends slidably within this bore and terminates at its bottom end in a heavy impact mass. Latch means support the piston and the means in spaced relation above an earth-contacting base plate. A firing signal actuates the latch means so as to release the mass, enabling the piston to drop within the housing bore. In so doing it exposes the upper piston surface to high pressure air entering the bore through sidewall ports provided for that purpose. This air pressure forcibly propels the mass downwardly to strike the baseplate, which couples the transferred kinetic energy into the earth as a seismic impulse. The contents of the afore-mentioned patent are incorporated herein by reference.

The operation of the above described seismic source is improved by the use of means such as described in U.S. Pat. No. 4,402,381 issued Sept. 6, 1983 to Tom P. Airhart and entitled Vehicle Mounting and Deployment Arrangement for Seismic Source. According to this patent, also incorporated herein by reference, adjustable vertical supports consisting of single rod-end hydraulic cylinders are positioned between the vehicle chassis and the base plate. When the baseplate is deployed at a particular location the cylinders are operated like jacks to transfer the weight of the vehicle, at least in part, so that it rests upon and keeps the baseplate from shifting position under repeated blows from the impact mass. The bottom ends of the piston rods are not physically attached to the base plate but instead are provided with transverse bearing plates which are guided into contact with the upper base plate surface as the rods are extended. This guidance is provided by means of upstanding posts fixed to the base plate which make sliding contact with the edges of the bearing plates. When the base plate is to be picked up from the earth for redeployment or transport, these bearing plates conveniently engage lift rings also mounted upon and fastened to the baseplate.

The present invention is designed to further improve upon the base plate alignment means taught in U.S. Pat. No. 4,402,381 in order to achieve superior results on uneven terrain and with varying modes of operation. In order to appreciate the importance of such alignment in the generation of seismic waves, it is necessary to analyze the way in which such waves are produced. In generating seismic waves by impacting a base plate, the angle between the path of the descending mass and the plane of the base plate as it contacts the earth determines the relative proportions of compressional and shear waves so generated. When, for example, the apparatus is used to generate compressional waves only, the path of the descending mass must be perpendicular to the plane of the base plate even if it rests on a non-horizontal earth surface. Alternatively, the generator may be operated so that the mass strikes the base plate along a tilted or inclined path or along opposing inclined paths. Such a mode of operation is described in commonly assigned copening U.S. Patent application Ser. No. 6-676762 filed Nov. 3, 1984, in the name of Tom P. Airhart entitled, Mounting and Control Means for Full Wave Form for Seismic Source. In such case the null position of the actuator axis from which the necessary angular tilts are reckoned must be at right angles to the base plate plane. Otherwise the presumed proportions of compressional and shear wave components in the resultant seismic wave will not be present. Furthermore, if the base plate slides or translates along the earth's surface under a slanting blow such as described above, the vehicle will have to be shifted so that the actuator is again correctly positioned over the center of the base plate. If not, successive wave forms will differ in energy content, the base plate may be damaged, and other components of the system may be heavily stressed.

SUMMARY OF THE INVENTION

It is therefore a general object of this invention to provide an improved vehicle-mounted surface seismic source utilizing an earth-contacting base plate impacted by a descending mass.

It is a more particular object of this invention to provide apparatus of the type described in which such base plate is automatically maintained in proper alignment relative to other source components.

It is still further object of this invention to provide apparatus of the type described where such alignment may be maintained during operations on uneven or slanted earth surfaces.

It is a yet further object of this invention to provide apparatus of the type described wherein the lateral misalignment of the base plate is compensated without risk of mechanical damage to other associated equipment.

Other and further object s and advantages of this invention will become evident from a consideration of the detailed description to follow read in conjunction with the accompanying illustrative drawings.

The present invention complates an improved base plate locator system for an impact type surface seismic source transported by a vehicle wherein such source comprises an impact mass, means carried on the vehicle for supporting the mass above an earth-contacting base plate, means cooperating with the support means for propelling the mass downwardly to strike the base plate, and adjustable hydraulic cylinder means secured to the vehicle having an axis of travel perpendicular to the longitudinal chassis axis of the vehicle, and being downwardly extendable in a manner to transmit vertical force from the vehicle to the baseplate. Such base plate locator system comprises elastic means dependently secured to the hydraulic cylinder means, first position location means secured to the base plate so as to face the elastic means and second position location means secured to the elastic means and adapted to slidably engage with said first position location means as said hydraulic cylinder means are so extended such that said vertical force is transmitted to said base plate sequentially through said elastic means, and said first and second position locations means, whereby a lateral shift of the baseplate relative to the hydraulic cylinder means imparts elastic strain to the elastic means in the direction of said shift. In a more limited aspect the first position locating means is a plurality of spaced apart similarly configured elongated projections extending upwardly from the surface of the baseplate and the second position location means is a like plurality of adapter members provided respectively with upwardly opening indentations each of which is adapted to receive therein a respective one of the plurality of projections. In a still more limited aspect of this invention, these projections are oriented in respect to such adapter plates such that slidable engagement with the corresponding indentations in the adapter members induces shear strain in the elastic means in predetermined directions.

BRIEF DESCRIPTION OF THE DRAWINGS

FIG. One is a side elevation of a baseplate locator system constructed in accordance with a preferred embodiment of the present invention showing the baseplate in a raised transport position.

FIG. Two is a side elevation of the system of FIG. One showing the baseplate lowered into position on the earth.

FIG. Three is a plan view of the baseplate used in the system of FIG. One.

FIG. Four is a vertical section taken along the line 4—4 in FIG. Three.

FIG. Five is a sectional view of the apparatus taken along the line 5—5 in FIG. One.

FIG. Six is a detailed vertical sectional view of the first and second position location means of this invention taken along the line 6—6 in FIG. One.

FIG. Seven is a detailed vertical sectional view of the first and second position location means of this invention taken along the line 7—7 in FIG. Five.

FIG. Eight is an isometric view of the first and second position location means of the present invention in a fully engaged position.

FIG. Nine is a diagramatic plan view of the first and second location means of this invention shown fully engaged.

DETAILED DESCRIPTION OF THE PREFERRED EMBODIMENTS

Figure 1:
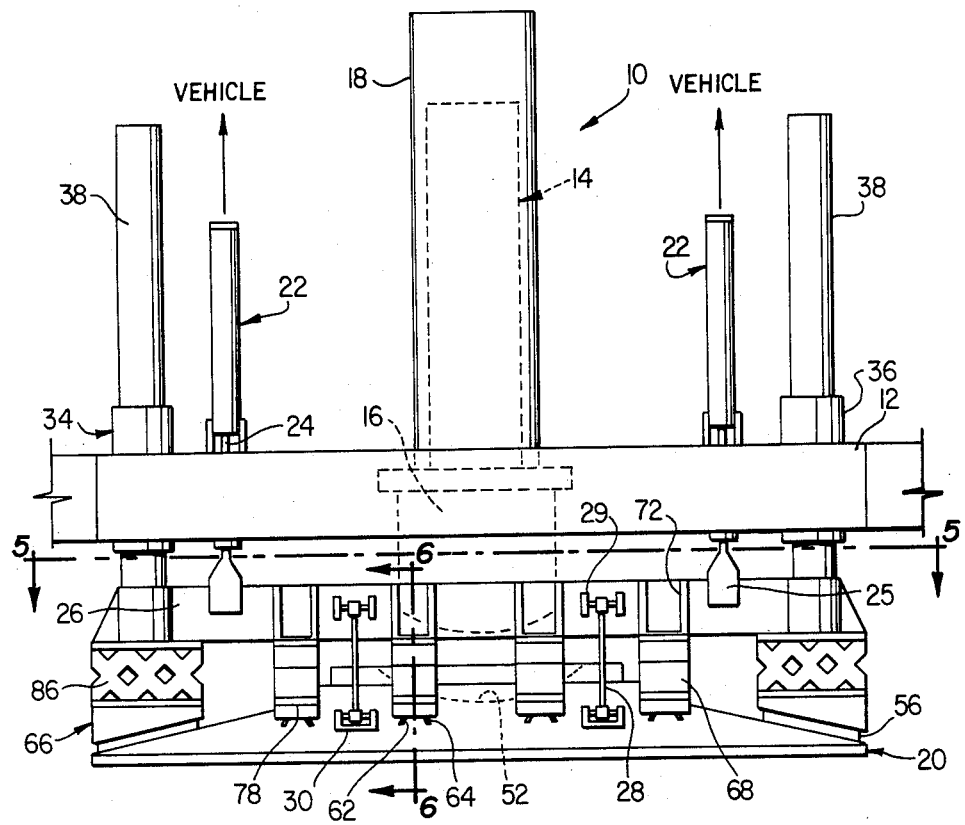
Figure 2:
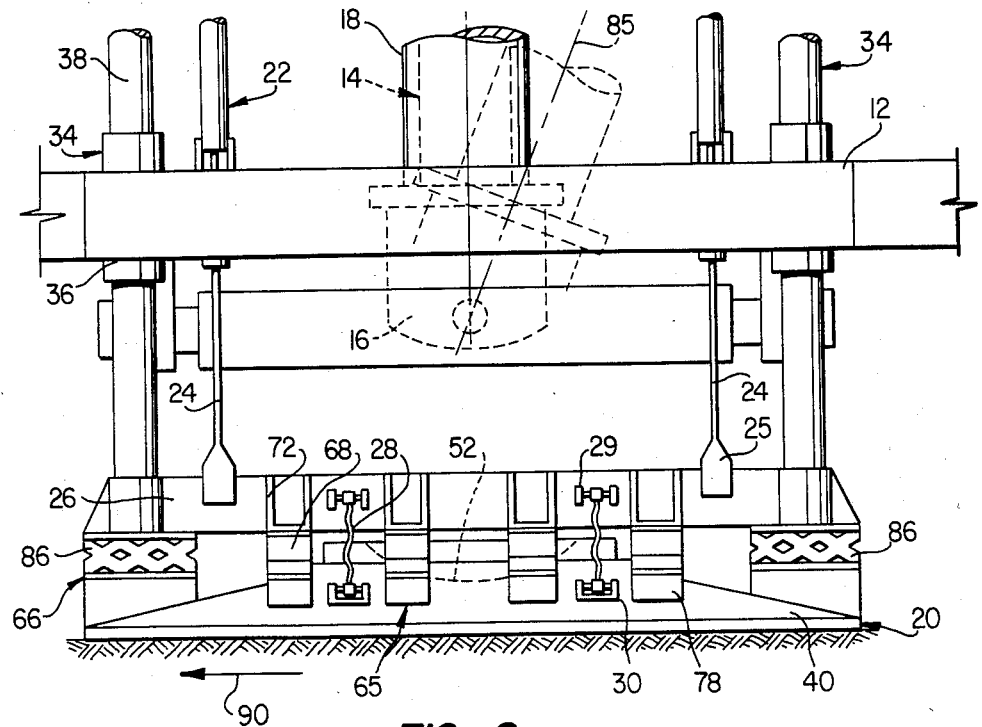

Referring now to the drawings and in particular FIGS. 1 and 2 a surface impact type seismic source is indicated generally by the reference numeral 10 as carried on the longitudinal chassis 12 of a transport vehicle (not shown). The source 10 may be generally of the type described application Ser. No. 6-676762, referenced above, the particulars of which are unnecessary to detail here. For the purposes of this invention it is sufficient to note that an elongated piston 14 terminating at its lower end in an impact mass 16 is slidably supported upwardly within an open bottomed upstanding cylindrical housing 18. In a firing operation piston 14 is propelled downwardly along a path of adjustable direction so as to strike baseplate 20 in its earth contacting position as illustrated in FIG. 2. The actuator of source 10 consisting of piston 14, mass 16, housing 18 and the associated equipment for propelling mass 16 and returning it to its support position do not, per se, comprise a part of the present invention.

As best seen in FIGS. 1 and 2, baseplate 20 is raised and lowered by means of four adjustable single rod-end hydraulic lift cylinders 22 arranged in quadrature and secured to chassis 12 so that their axes of travel extend perpendicularly thereto. The lower ends of piston rods 24 of cylinders 22 are threaded into adapters 25 which are in turn bolted or otherwise fixed to an open rectangular transverse lift frame 26. In order to link lift frame 26 with the base plate 20 a plurality of similar vertically extending spaced apart flexible lift cables 28 are interconnected between brackets 29 on lift frame 26 and brackets 30 on baseplate 20. When piston rods 24 are retracted such that baseplate 20 is supported above the earth, cables 28 are under tension as shown in FIG. 1. When, preparatory to a firing operation, baseplate 20 is lowered to the earth by extending rods 24, cables 28 buckle or fold up as shown in FIG. 2. This way, baseplate 20 is free to move downwardly under a blow from mass 16 without restraint in elastically deforming the earth's surface.

In order to provide lateral stability for source 10 four upstanding elongated guides 34 are positioned in parallel adjacent relation to hydraulic cylinders 22. Each guide 34 comprises a sleeve 36 fixed to chassis 12 and a guide shaft 38 slidably received therein, whose lower end is secured to lift frame 26. As hydraulic cylinders 22 are operated, shafts 38 ride up and down within sleeves 36 and thereby counteract any tendency of hydraulic cylinders 22 and lift frame 26 to become unbalanced by lateral shifting.

After baseplate 20 is lowered to the earth, rods 24 are still further extended in order to bring the weight of the transport vehicle, including source 10, to bear, at least in part, upon baseplate 20. Means such as will be described, are interposed between baseplate 20 and lift frame 26 not only for transmitting vertical force to baseplate 20 but also to establish and maintain proper alignment between baseplate 20 and lift frame 26. This invention is particularly concerned with the construction and operation of such means.

Figure 3:
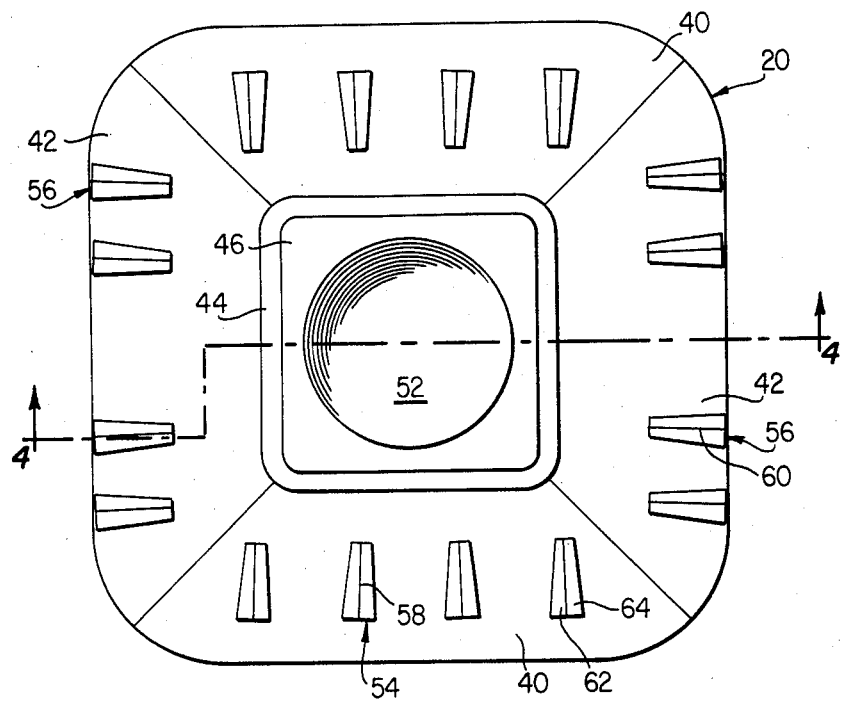
Figure 4:
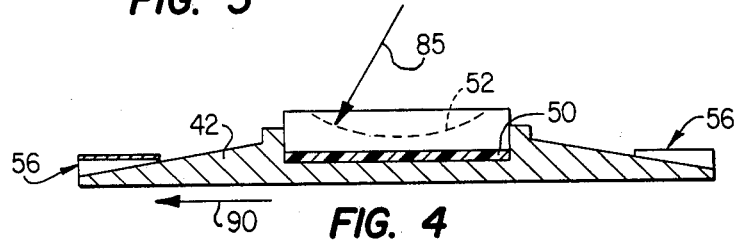

As best seen in FIGS. 3 and 4 generally rectangular baseplate 20 comprises two pairs of like opposing peripheral sections 40 and 42 whose upper surfaces slope from their outer to their inner edges to meet a hollow upstanding cylindrical hub 44 within which a slidable striker plate 46 rests upon elastomeric cushion 50. The concave upwardly facing surface 52 of striker plate 46 is contoured to accomodate any selected path of the descending mass 20 whether vertical or inclined. Baseplate 20 is preferably oriented such that the inner and outer edges of sections 40 extend generally parallel to the longitudinal axis of chassis 12, the corresponding inner and outer edges of sections 42 being generally transverse thereto. A plurality of spaced apart elongated, inverted V-shaped projections 54 and 56 as seen in FIG. 3 extend above the upper surfaces of sections 40 and 42 so that their respective horizontal ridges 58 and 60 extend at right angles to each other and substantially at right angles to and parallel to longitudinal axis of chassis 12. The construction and operation of all projections 54 and 56 is essentially the same. Thus as seen in FIGS. 3, 7 and 8 any projection 54 comprises a pair of upwardly convergent slanting flat plates 62 and 64 which are cut to fit the upwardly sloping surface of section 40. The purpose of projections 54 and 56 is to serve as lower position location means. The corresponding upper position location means will now be described.

Figure 5:
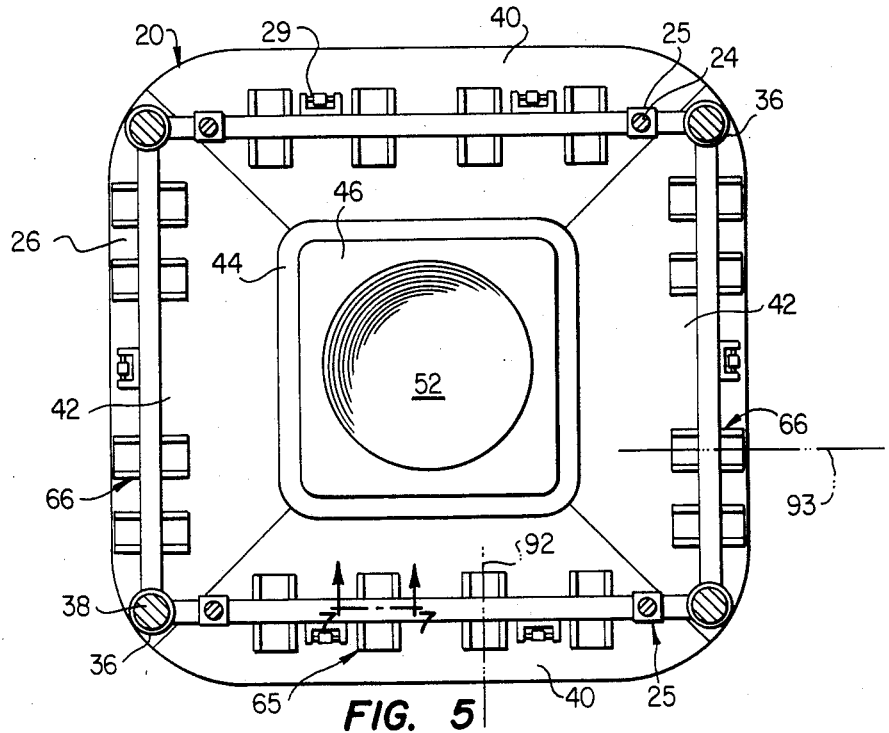

Dependently secured to lift frame 26, positioned and spaced in general vertical alignment with projections 54 and 56 as seen in FIG. 5 are a like plurality of upper position location assemblies 65 and 66 which are adapted to slidably engage with projections 54 and 56 respectively. The construction of all assemblies 65 and 66 is essentially the same. With particular reference to FIGS. 6 and 7 a typical assembly 65 is seen to consist of an elastic member 68 bolted at top and bottom respectively to retainer plates 69 and 70. Plate 69 is welded to lift frame 26 by means of angle brackets 72 and 73. Plate 70 is in turn welded to upper adapter member 75 which generally comprises top plate 76, end plate 78, parallel outer side plates 79 and 82 and upwardly sloping inner plates 80 and 81 which convergently join to form an indentation matching the contour of projection 54. Elastic member 68 preferably consists of a pad of elastomeric material which exhibits 3-dimensional elasticity and which is penetrated by a plurality of spaced apart square apertures 83.

When baseplate 20 is raised above the earth in order to move the source 10 from one location to another cables 28 serve to limit the maximum vertical separation between lift frame 26 and baseplate 20. However, cables 28 do not prevent baseplate 20 from swinging from side to side. In this raised transport position assemblies 65 and 66 are maintained in partial slidable engagement with projections 54 and 56. This condition is shown in FIGS. 6 and 7. As shown, end plate 78 of adaptor member 75 has slidably contacted one end of projection 54. Sloping inner plates 80 and 81 lie in spaced relation above the corresponding convergent plates 62 and 64 of projection 54. That way relative lateral movement of any assembly 65 with respect to any projection 54 in two orthogonal directions is either blocked entirely or limited to a fraction of an inch. As piston rods 24 are extended, assembly 65 fully engages in load transmitting contact with projection 54, as best seen in FIG. 8. Each elastomeric member 68 is now compressed, the purpose of apertures 83 being to prevent ballooning of the sidewalls of member 68 under pressure. Plates 80 and 81 are now fully in contact with plates 62 and 64. End plate 78 has been omitted in FIG. 8 in order to show this relationship. However, end plate 78 now completely covers the outboard end of projection 54 as seen in FIG. 2. When in this condition a mass 16 delivers a slanting blow to baseplate 20, base plate 20 may shift position slightly in the azimuthal direction of such slanting blow. The extent of such shift will depend upon both direction of the blow and the character of the terrain. Suppose, for example that responsive to a blow from mass 16 delivered along slant path 85, base plate 20 shifts along the earth in the direction of the horizontal component of path 85 as illustrated in FIGS. 2 and 4. Elastic members 86 will thereby be subjected to shear strain along their length in the same direction of movement as base plate 20 because their upper surfaces are rigidly secured to lift frame 26. Since base plate 20 is pressed against the earth by the weight of the transport vehicle, and is not free to regain its original position, the vehicle itself will relocate to relieve the stress in elastic members 86. At the same time that this is happening, the interaction of location assemblies 65 and the corresponding projections 54 will induce an elastic strain in elastic members 68, but at right angles to their longest dimension, as may be best appreciated from an examination of FIG. 3. In this way, further restorative force is applied to help relocate the vehicle and source 10 in proper perpendicular relation to the plane of base plate 20. Thus, the advantage of having two sets of orthogonally extending position location means is that no matter in what direction baseplate 20 shifts in operation, elastic strain will be induced in members 68 and 86 which urges corrective relocation of source 10 with respect to base plate 20.

The wedge shape of projection 54 and 56 is well suited to absorb lateral interaction with assemblies 64 and 66 without mechanical failure. Previous to this invention, when positioning of base plate 20 was accomplished with insertion of vertical pins in to mating sockets the pins tended to shear off under side loads.

Elastic members 68 and 86 not only transmit a relocating force to the transport vehicle as described above; they also act to insure uniform application of the vertical force over the area of base plate 20 as seating occurs. If, for example, the plane of lift frame 26 is inclined relative to that of base plate 20 when base plate 20 is lowered upon uneven terrain, elastic stresses will automatically be induced in elastic members 68 and 86 in varying degrees depending upon the nature of the misalignment. These stresses will tend to "right" the vehicle itself so that the major axis of source 10 is oriented perpendicularly to the plane of base plate 20 even though it tilts from the true horizontal.

Further use of the elasticity of members 68 and 86 can be made by a deliberate slight misalignment of the assemblies 65 and 66 in respect to projections 54 and 56. The object is to provide that slideable engagement between these respective components automatically prestresses elastic members 68 and 86. One way to do this is to position each of projections 54 and 56 a fraction of an inch "outboard" of its mating assembly 65 or 66. That way, all elastic members 68 and 86 will become prestressed with partial engagement between assemblies 65 and 66 and projections 54 and 56, respectively, and this stress will increase until full engagement is reached. This prestress will occur outwardly in two right angular directions away from the center of base plate 20. This prestress will supply further restorative force to correct for lateral shift of base plate 20 in any such direction. Another way to induce restoring prestress in elastic member 68 and 86 is illustrated in the diagram of FIG. 9. The axis of ridges 58 and 60 may be angularly offset several degrees so they do not lie precisely parallel to the sides of frame 26 as are the major axes of assemblies 65 and 66. Thus, engagement between assemblies 65 and 66 and projections 54 and 56 neccessarily induces a twisting strain into elastic members 68 and 86. This again adds to the available elastic restoration force tending to correctly reposition the vehicle if base 20 shifts in the direction of such strain.

Prior to the development of the position location means described herein the use of pin locators fitting within recesses in baseplate 20 proved to create problems when operations were conducted in sand and other loose soil. During operation soil particles were moved over the edge of base plate 20 and became trapped in the locator holes necessitating periodic cleaning. The use of raised projections 54 and 56 effectively eliminates the problem of sand and dirt accumulation. Perhaps more important is the fact that the V-shaped construction of projections 54 and 56 has facilitated preloading of elastic members 58 and 56 for positive relocation of the transporting vehicle over baseplate 20 even on sloping surfaces.

If desired, means other than elastomeric pads may constitute elastic members 68 and 86. For examle a coiled upstanding spring properly supported can be made to exhibit the necessary three dimensional elasticity.

Although a preferred embodiment of the present invention has been described in detail it is to be understood that various changes, substitutions and alterations may be made therein without departing from the spirit and scope of the invention as defined in the appended claims.

What is claimed is:

1. In combination with a vehicle and an impulsive seismic source carried thereby having a freely-movable baseplate for engaging the surface of the earth beneath the vehicle and receiving an impact from a moving mass, apparatus for maintaining relative alignment between the vehicle and the baseplate comprising:
    (a) lift means secured to the vehicle and disposed extensibly between the vehicle and the baseplate;
    (b) elastic means exhibiting three-dimensional elasticity fixed dependently to the lift means;
    (c) first and second means positioned between and secured respectively to the baseplate and the elastic means for mechanically coupling the lift means to the baseplate, such first and second means forming in combination at least one projection and one matching indentation adapted to enter slidably into load-bearing engagement with each other responsive to extension of the lift means so as to transmit vehicle weight to the baseplate and further transmit lateral force on the baseplate to the elastic means; and
    (d) the projection and indentation each comprising a pair of flat surfaces convergent to form a ridge extending generally parallel to the plane of the baseplate wherein the ridge of the projection is angularly misaligned with that of the indentation such that the engagement of the projection with the indentation induces strain in the elastic means opposing such misalignment.

2. In combination with a vehicle and a seismic source carried thereby having a freely-movable baseplate for coupling impulsive energy into the earth, apparatus for maintaining relative alignment between the vehicle and the baseplate comprising:
    (a) hydraulic cylinder means secured to the vehicle and disposed between the vehicle and the baseplate;
    (b) flexible means for linking the hydraulic cylinder means and the baseplate so as to permit a limited separation therebetween;
    (c) elastic means exhibiting three-dimensional elasticity dependently attached to the hydraulic cylinder means;
    (d) first and second means positioned between and secured respectively to the baseplate and the elastic means for mechanically coupling the hydraulic cylinder means to the baseplate, such first and second means forming in combination at least one projection and one matching indentation adapted to enter into full load-bearing engagement with each other responsive to extension of the hydraulic cylinder means so as to transmit vheicle weight to the baseplate and further transmit lateral force on the baseplate to the elastic means;
    (e) the flexible means and the first and second means being dimensioned such that when the flexible means are tensed by retraction of the hydraulic cylinder means the first and second coupling means are partially engaged so as to limited their relative lateral movement and when the first and second coupling means are fully engaged the flexible means are relaxed to permit downward movement of the baseplate.

3. The apparatus as claimed in claim 2 wherein:
    (a) the at least one projection is a plurality of projections and the at least one indentation is a plurality of respectively matching indentations, each of such projections and indentations comprising a pair of flat surfaces convergent to form a ridge extending generally parallel to the plane of the baseplate, such ridges being collectively oriented so as to extend symmetrically outward from the center of the baseplate; and
    (b) the plurality of indentations being laterally offset toward the center of the baseplate with respect to the plurality of projections such that their full engagement induces strain in the elastic means directed outwardly from the center of the baseplate.

* * * * *